US011099371B2

(12) United States Patent
Miller et al.

(10) Patent No.: US 11,099,371 B2
(45) Date of Patent: Aug. 24, 2021

(54) TELESCOPE BYPASS MIRROR MECHANISM WITH MINIMIZED STOW VOLUME

(71) Applicant: Raytheon Company, Waltham, MA (US)

(72) Inventors: Kirk A. Miller, Dallas, TX (US); Andrew Short, Allen, TX (US)

(73) Assignee: Raytheon Company, Waltham, MA (US)

( * ) Notice: Subject to any disclaimer, the term of this patent is extended or adjusted under 35 U.S.C. 154(b) by 727 days.

(21) Appl. No.: 15/839,573

(22) Filed: Dec. 12, 2017

(65) Prior Publication Data
US 2019/0179129 A1    Jun. 13, 2019

(51) Int. Cl.
*G02B 23/02*     (2006.01)
*G02B 26/08*     (2006.01)
(Continued)

(52) U.S. Cl.
CPC ............. *G02B 23/02* (2013.01); *G02B 7/182* (2013.01); *G02B 7/1827* (2013.01); *G02B 17/0694* (2013.01); *G02B 26/0816* (2013.01)

(58) Field of Classification Search
CPC ........ G02B 23/02; G02B 23/00; G02B 23/10; G02B 23/105; G02B 23/16; G02B 27/182; G02B 27/1827; G02B 27/1821; G02B 27/1822; G02B 17/0694; G02B 26/0816; G02B 26/08; G02B 17/00; G02B 17/02; G02B 17/06; G02B 17/0626; G02B 17/0636; G02B 17/0642; G02B 17/0684
See application file for complete search history.

(56) References Cited

U.S. PATENT DOCUMENTS 5,009,494 A * 4/1991 Iossi ................ G02B 17/0636
                                                                                                                359/366
6,970,286 B1    11/2005   Kunick
(Continued)

FOREIGN PATENT DOCUMENTS

| CN | 107132635 A | 9/2017 |
| EP | 1387203 A1 | 2/2004 |
| JP | H0519180 A | 1/1993 |

OTHER PUBLICATIONS

CN107132635, English language machine translation, generated Jun. 20, 2020 (Year: 2017).*
(Continued)

*Primary Examiner* — Stephone B Allen
*Assistant Examiner* — Adam W Booher

(57) ABSTRACT

An optical system (e.g., a telescope) comprising an optical assembly that reflects and refracts light rays through a single window about an optical path to a detector. A field-of-view bypass assembly comprises a bypass mirror movably coupled with respect to the optical assembly. The bypass mirror is selectively translatable and tiltable between a bypass configuration and a retracted configuration. In the bypass configuration, the bypass mirror is disposed in and interrupts the primary optical path and oriented to define a secondary optical path to the detector. In the retracted configuration, the bypass mirror is both disposed out of the primary optical path and is properly shielded to prevent stray light reflections.

25 Claims, 11 Drawing Sheets

(51) Int. Cl.
   *G02B 7/182*   (2021.01)
   *G02B 17/06*   (2006.01)

(56) References Cited

U.S. PATENT DOCUMENTS

| 8,154,712 | B2 | 4/2012 | Kunick | |
|---|---|---|---|---|
| 2004/0027657 | A1* | 2/2004 | Steiner | G02B 26/0816 |
| | | | | 359/407 |
| 2005/0237517 | A1* | 10/2005 | McHugh | G01B 11/272 |
| | | | | 356/153 |
| 2018/0157018 | A1 | 6/2018 | Miller | |

OTHER PUBLICATIONS

Vizgaitis et al., 3$^{rd}$ Generation FLIR Demonstrator, Proceedings of SPIE, Apr. 15, 2008, 10 pages, vol. 6940, SPIE, Bellingham, Washington.

International Search Report for International Application No. PCT/US2018/055509 dated Jan. 30, 2019, 16 pages.

\* cited by examiner

TELESCOPE BYPASS MIRROR MECHANISM WITH MINIMIZED STOW VOLUME

BACKGROUND

There are numerous applications for optical imaging systems that require a high sensitivity narrow field-of-view telescope for detection and discrimination purposes. It is also frequently desirable, however, to additionally capture a wide field-of-view in order to achieve greater situational awareness. Typically, switching between fields-of-view involves the use of moving parts, such as mounts, laterally movable lenses (to provide "zoom") or other movable optical components, such as a field-of-view switch.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 11 is a partial exploded view of the field-of-view bypass assembly of the optical system of FIG. 1a;

Figure 1A:
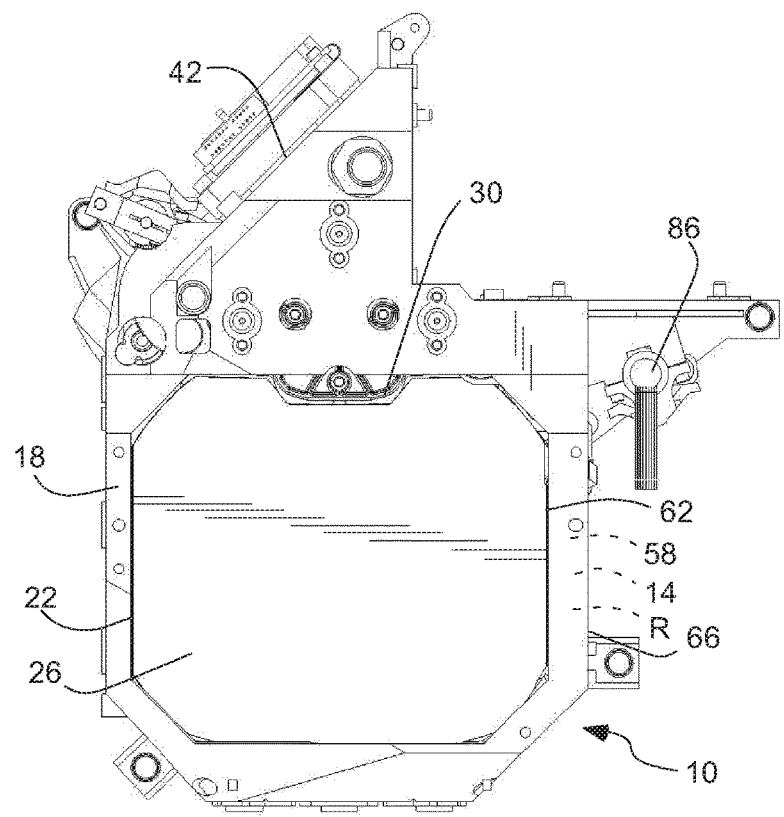
FIG. 1a is a front view of an optical system of a reflective telescope having a field-of-view bypass assembly in a retracted or non-bypass configuration in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example, there is provided an optical system that can be part of a reflective, high-magnification telescope, which in turn can be party of a turreted sensor system. The telescope, or optical system thereof, can direct collimated light to one or more imagers or detectors, such as infrared (IR) sensors, mid-wave infrared (MWIR) sensors, short wave infrared (SWIR) sensors, day television (DTV) cameras, etc. The optical system can have multiple curved or flat mirrors that direct light beams received through a single window to the one or more imagers or detectors, defining an optical assembly a primary optical path. In addition, the optical system can have a normal or standard configuration with a narrower field-of-view and a higher magnification (such as 4×), and a bypass or switch assembly that can transition the optical system to a wider field-of-view and a lower magnification (such as 1×). The bypass assembly can have a bypass mirror that interrupts the primary optical path to create a secondary optical path, and that can bypass one or more of the curved mirrors of the optical assembly, thus altering a magnification of the optical system. In one aspect, the bypass assembly can be compact and provided in an existing and available space of the optical system. The bypass assembly and the bypass mirror can have an extended bypass configuration and a retracted storage configuration. The bypass assembly can be articulated so that the bypass mirror can be both translated or displaced, and oriented or tilted, into the primary optical path, and between the bypass and retracted configurations.

In the retracted configuration, the bypass mirror and the bypass assembly can be disposed in an existing lateral volume between the optical system and a housing containing the optical system. The bypass assembly can be stored in a width of the wall of the housing of the optical assembly of the telescope. Thus, the bypass assembly can minimize stow volume. In another aspect, the bypass assembly can resist or control stray light reflections. For example, the bypass mirror of the bypass system can be oriented to face towards the housing and away from the optical system when oriented in the retracted configuration. Thus, the bypass assembly can minimize or control stray light reflections. In addition, the bypass assembly can be self-shuttering. Utilizing the articulated bypass assembly can also minimize exterior windows, i.e. utilize a single window, and can have both the wider and narrower field-of-views coincident for field-of-view coincidence. The bypass assembly and the bypass mirror reflects and translates a wider imager field-of-view out through a main aperture window.

Figure 1B:
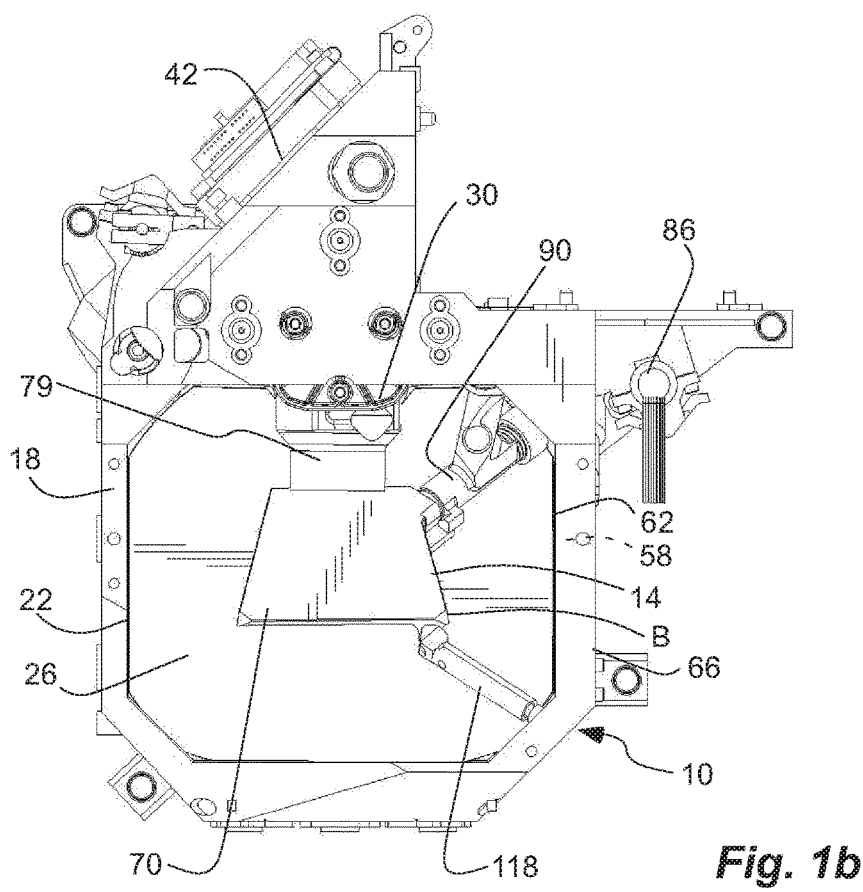
FIG. 1b is a front view of the optical system of FIG. 1a, with the field-of-view bypass assembly in a bypass configuration in accordance with an example of the present disclosure.
Figure 2A:
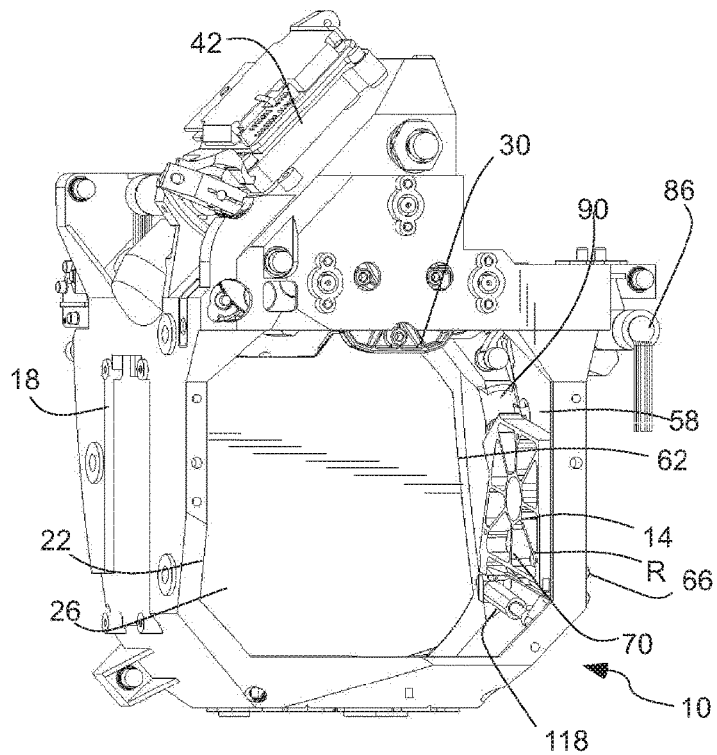
FIG. 2a is a front perspective view of the optical system of FIG. 1a, with the field-of-view bypass assembly in the retracted or non-bypass configuration.
Figure 2B:
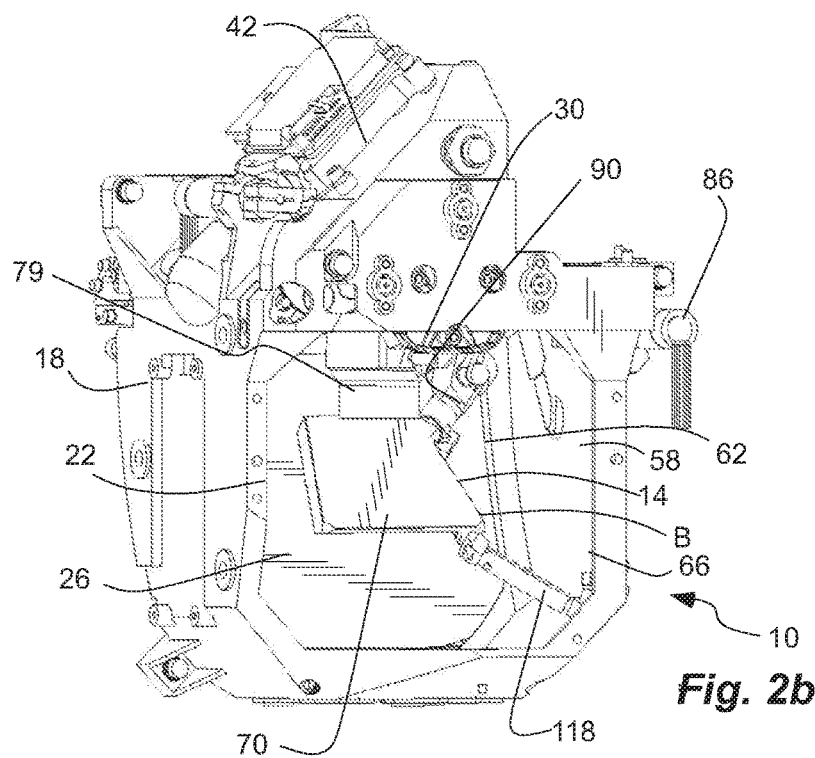
FIG. 2b is a front perspective view of the optical system of FIG. 1a, with the field-of-view bypass assembly in the bypass configuration.

FIG. 1a depicts an optical system 10 of a reflective, high-magnification telescope with a field-of-view bypass or switch assembly 14 in a retracted, storage, normal or non-bypass configuration R; while FIG. 1b depicts the optical system 10 with the field-of-view bypass assembly 14 in an extended or bypass configuration B. Similarly, FIG. 2a depicts the optical system 10 with the field-of-view bypass assembly 14 in the retracted configuration R; while FIG. 2b depicts the optical system 10 with the field-of-view bypass assembly 14 in the bypass configuration B. The optical system 10 with the bypass assembly 14 in the retracted configuration R can correspond to a normal use configuration of the optical assembly and the telescope, and a narrower field-of-view; while the optical system 10 with the bypass assembly 14 in the bypass configuration B can correspond to a wider field-of-view. The optical system 10 can have a housing or frame 18 with a single window or opening or inlet 22. The window 22 can be faced forwardly or towards a scene or object of interest. The housing 18 can contain and carry multiple optics and optical elements. The optical system 10 and the housing 18 can be an existing optical system and an existing housing with a defined configuration, size, and shape with existing dimensions. In the retracted configuration R, the bypass assembly 14 utilizes available space in the housing 18 of the existing optical system and the existing housing.

Figure 3:
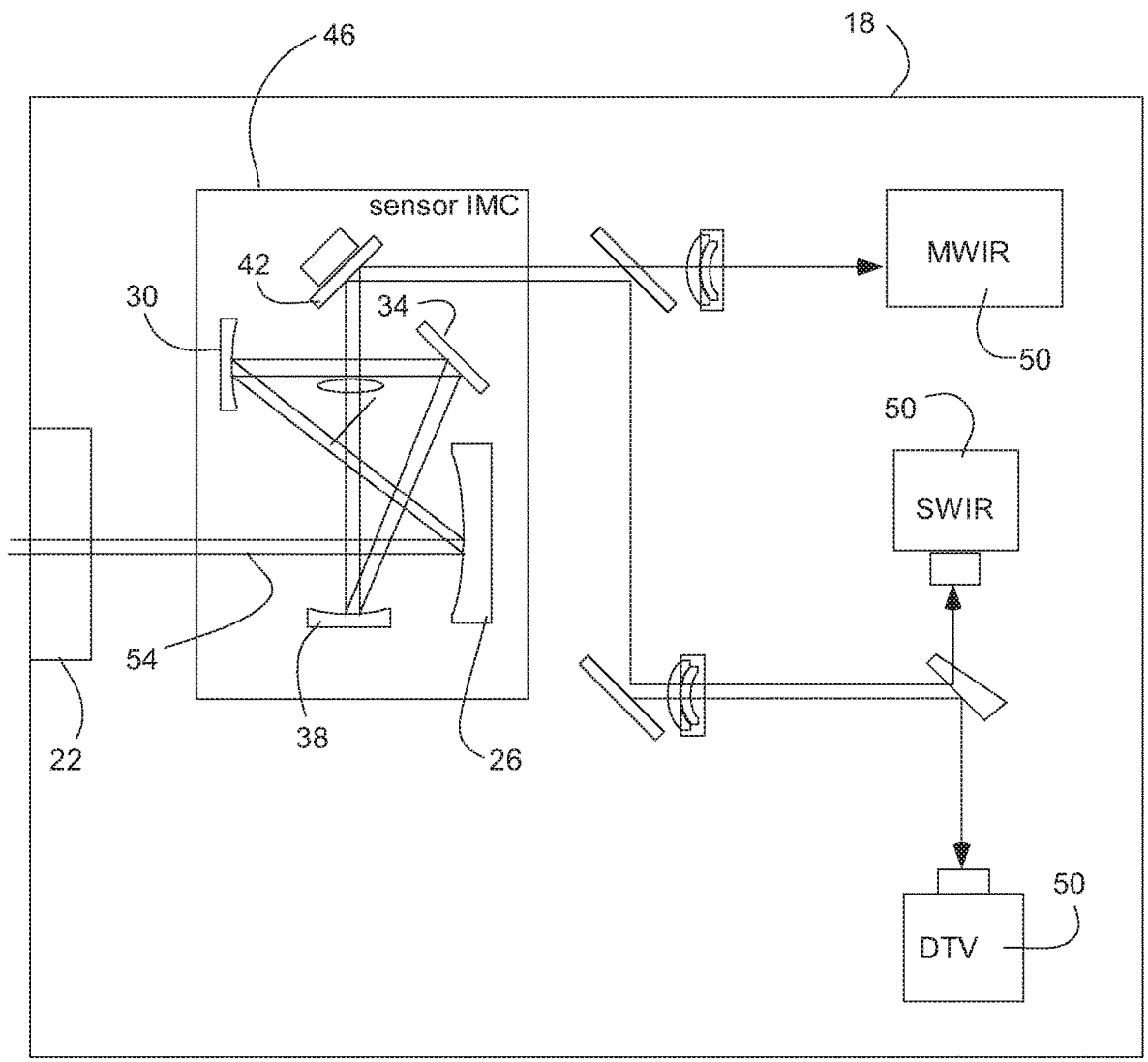
FIG. 3 is a block diagram of the optical system of FIG. 1a showing an optical assembly with a primary optical path.

FIG. 3 depicts a block diagram of the optical system 10 in normal or standard configuration (corresponding to the bypass assembly being in the retracted configuration). The housing 18 contains and carries multiple optical elements, such as a curved primary mirror 26, a curved secondary mirror 30, a first flat mirror 34, a curved tertiary mirror 38, and a second flat mirror 42, all together defining an optical assembly 46. Other optical elements can be included in the optical assembly 46, and some optical elements can be omitted based on need or desired configuration. In addition, other optical elements can be disposed outside of the housing 18. In one example, these optical elements can be part of a fore optics assembly of the reflection, high-magnification telescope. While this optical assembly 46 and this telescope utilizes powered mirrors and flat mirrors, other telescope forms can be used.

Incident beams (i.e., light or light rays) from a scene or an object (not shown) can be passed through the single aperture or window 22 and reflected by the optical assembly 46 to one or more detectors, sensors or cameras 50, either in the housing 18 or outside of the housing 18. The optical assembly 46 can be arranged to define a primary optical path 54 to the detector(s) 50. The primary optical path 54 can correspond to a narrower field-of-view, with the bypass assembly 14 in the retracted configuration R. The beams or light rays can impinge or can be incident upon the primary mirror 26. Stated differently, the primary mirror 26 can be situated relative to the window 22 to receive the beams or light rays. The beams or light rays can then be reflected by the primary mirror 26 to the secondary mirror 30; from the secondary mirror 30 to the first flat mirror 34; from the first flat mirror 34 to the tertiary mirror 38; from the tertiary mirror 38 to the second flat mirror 42; and from the second flat mirror 42 to the one or more detectors, sensors or cameras 50. Again, the configuration of the optical assembly 46, and the number and types of mirror, can be varied based on the desired configuration.

The one or more detectors, sensors or cameras 50, for example, can receive and transmit signals associated with the beams or the light rays to a computer system or displays (not shown) in a known manner for processing the signals. Alternatively, one detector or a multiplicity of other sensors can receive the signals. In any event, the detector can be any suitable imaging detector or sensor for a telescope, such as a CCD, CMOS, photodiode array, light emitting device or other suitable imaging sensor capable of receiving and transmitting signals pertaining to light rays.

Referring again to FIGS. 1a-2b, a lateral volume 58 is defined between a lateral perimeter 62 of the optical assembly 46, or the primary optical path 54, and a lateral side 66 of the housing 18. In one aspect, the lateral perimeter 62 of the optical assembly 46 can be defined by a lateral perimeter of the primary mirror 26, or the lateral perimeter of the window 22, or both. The lateral direction is taken relative to a longitudinal axis of the housing 18, such as that defined by the primary optical path 54, and can be towards the lateral side 66, as shown, or above or below depending on the configuration of the optical assembly 46. In one aspect, the lateral volume 58 can exist in an existing configuration of the housing 18 and the optical assembly 46, as shown. Thus, the bypass assembly 14 can take advantage of an existing lateral volume 58. In another aspect, the housing 18 and the optical assembly 46 can be sized, shaped or located to create and define the lateral volume 58. Thus, the lateral volume can be created for the bypass assembly 14. The bypass assembly 14 can be disposed in the lateral volume 58 in the retracted configuration R, as shown in FIGS. 1a and 2a.

Figure 4A:
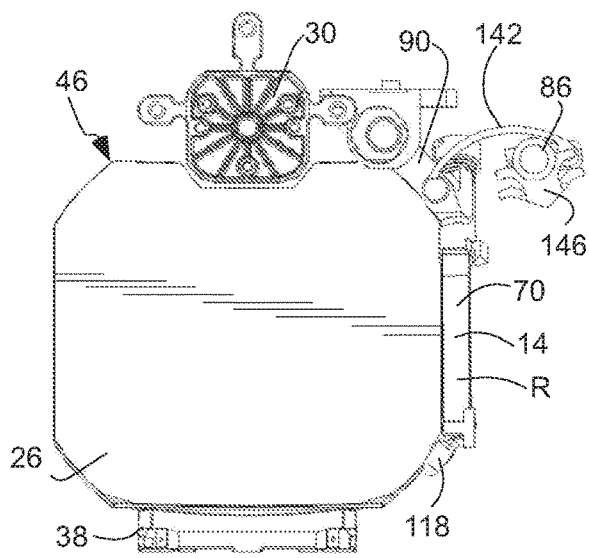
FIG. 4a is a front view of the field-of-view bypass assembly of the optical system of FIG. 1a, shown with a housing of the optical system removed, and with the field-of-view bypass assembly in the retracted or non-bypass configuration.
Figure 4B:
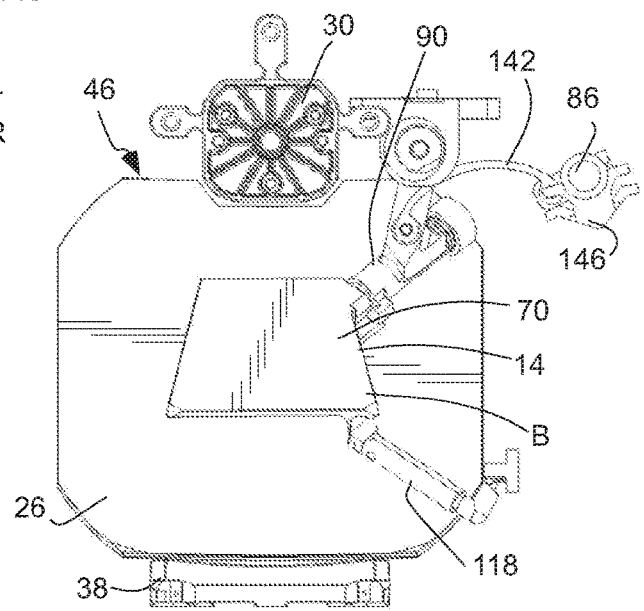
FIG. 4b is a front view of the field-of-view bypass assembly of the optical system of FIG. 1a, shown with the housing of the optical system removed, and with the field-of-view bypass assembly in the bypass configuration.
Figure 5A:
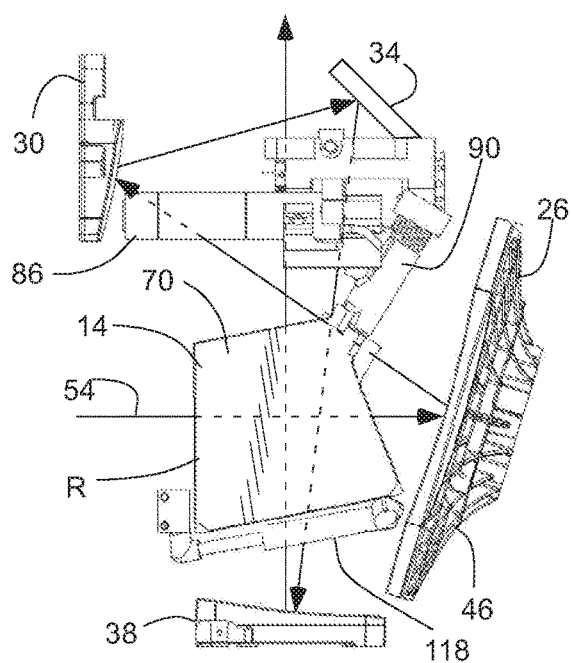
FIG. 5a is a side view of the field-of-view bypass assembly of the optical system of FIG. 1a, shown with the housing of the optical system removed, and with the field-of-view bypass assembly in the retracted or non-bypass configuration.
Figure 5B:
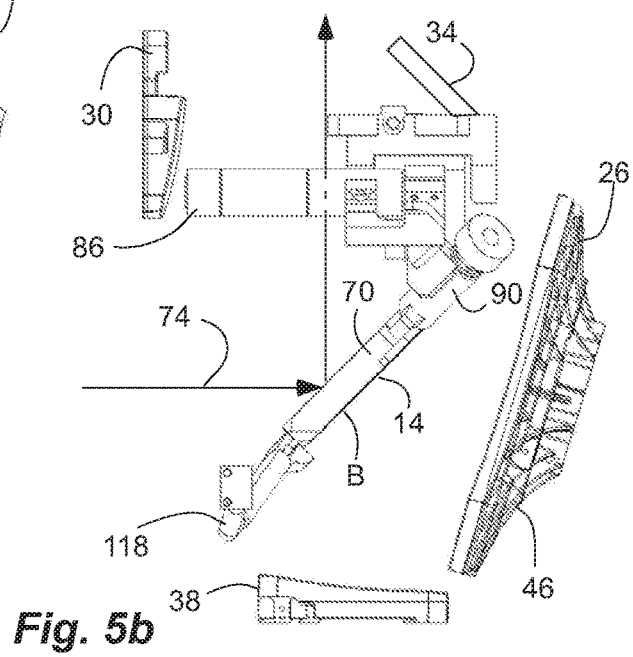
FIG. 5b is a side view of the field-of-view bypass assembly of the optical system of FIG. 1a, shown with the housing of the optical system removed, and with the field-of-view bypass assembly in the bypass configuration.
Figure 6A:
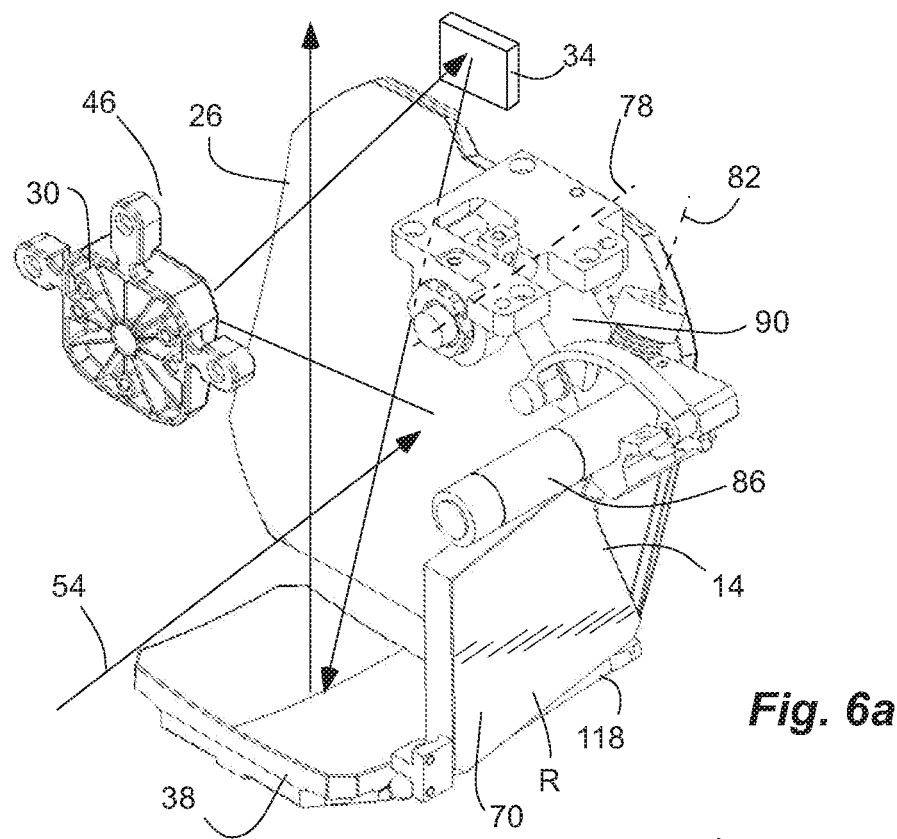
FIG. 6a is a front perspective view of the field-of-view bypass assembly of the optical system of FIG. 1a, shown with the housing of the optical system removed, and with the field-of-view bypass assembly in the retracted or non-bypass configuration.
Figure 6B:
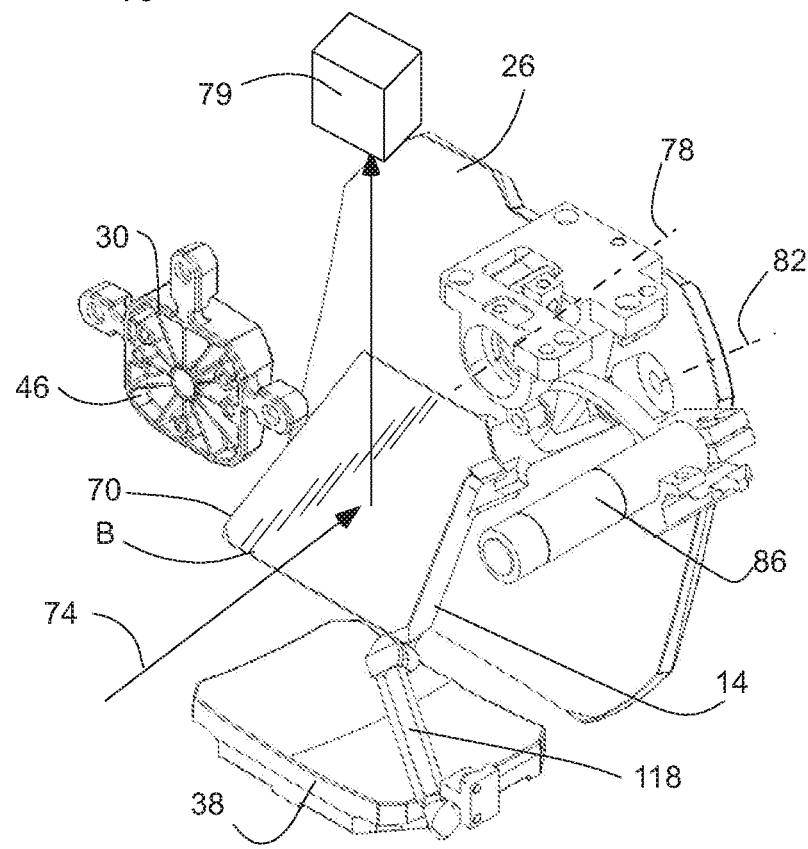
FIG. 6b is a front perspective view of the field-of-view bypass assembly of the optical system of FIG. 1a, shown with the housing of the optical system removed, and with the field-of-view bypass assembly in the bypass configuration.

FIGS. 4a and 4b depict looking into the optical system 10 with the housing 18 removed for clarity, and with the bypass assembly 14 in the retracted configuration R and the bypass configuration B, respectively. Similarly, FIGS. 5a and 5b depicts looking laterally at the optical system 10, again with the housing 18 removed for clarity, and with the bypass assembly 14 in the retracted configuration R and the bypass configuration B, respectively. Similarly, FIGS. 6a and 6b depict looking from a perspective view at the optical system 10, again with the housing 18 removed for clarity, and with the bypass assembly 14 in the retracted configuration R and the bypass configuration B, respectively. The bypass assembly 14 can comprise a bypass mirror 70 movably coupled with respect to the optical assembly 46 (and the housing 18 as shown in FIGS. 1a-2b). In one aspect, the bypass assembly 14 can have a single bypass mirror 70. The bypass assembly 14 can be articulated so that the bypass mirror 70 can be selectively translatable and tiltable, or displaceably and orientable, between the bypass orientation B and the retracted orientation R. Thus, the bypass mirror 70 both translates and tilts together between the orientations. The bypass configuration B and the retracted configuration R are different with respect to one another.

In the bypass configuration B, the bypass mirror 70 is disposed in and interrupts the primary optical path 54, and is oriented to define a secondary optical path 74 to the detector 50, as shown in FIGS. 5b and 6b The secondary optical path 74 can corresponding to a wider field-of-view than the primary optical path 54. In one aspect, the bypass mirror 70 interrupts the primary optical path 54 in the bypass configuration B, and bypasses optical elements of the optical assembly 46 that magnify the image, and reduce the field-of-view. Other optical elements 79 can also pivot into the secondary optical path 74 when the bypass mirror 70 is in the bypass configuration B, as shown in FIGS. 1b, 2b and 6b.

In the retracted configuration R, the bypass mirror 70 is both disposed out of the primary optical path 54, and is oriented transverse with respect to the bypass configuration B. Thus, the bypass mirror 70 is both displaced and reoriented. As mentioned above, the mirror 70 is both displaced and tilted together. In addition, in the retracted configuration R, the bypass mirror 70 can be oriented to face away from the primary optical path 54 and the optical assembly 46. Thus, the bypass mirror 70 can be both positioned and oriented to oppose a lateral side of the optical assembly 46 in the retracted configuration. In another aspect, in the retracted configuration R, the bypass mirror 70 can be disposed against or can abut to the lateral side 66 or wall of the housing 18.

Referring again to FIGS. 1a-2b, the bypass mirror 70 is disposed in the lateral volume 58 in the retracted configuration R. In addition, in the retracted configuration R, the bypass mirror 70 can be oriented to face towards the housing 18 and the lateral wall 66 thereof. The bypass mirror 70 can be both positioned and oriented to oppose the lateral wall 66 of the housing in the retracted configuration R. Thus, the bypass assembly 14 can be self-shuttering.

Thus, the bypass mirror 70 can be selectively translatable between two different positions, namely, a bypass position (shown with the field-of-view bypass or switch assembly 14 in the bypass configuration B), and a retracted position (shown with the field-of-view bypass or switch assembly 14 in the retracted configuration R) different from the bypass position. In the bypass position, the bypass mirror 70 is disposed in and interrupts the primary optical path 54. In the retracted position, the bypass mirror 70 is disposed out of the primary optical path 54. In addition, the bypass mirror 70 is selectively tiltable (i.e., can be tilted as needed or desired) between two different orientations, namely, a bypass orientation, and a retracted orientation different than the bypass orientation. The bypass orientation can correspond to the bypass position, and the retracted orientation can correspond to the retracted position. In the bypass orientation, the bypass mirror 70 is oriented to define the secondary optical path 74 to the detector, and can correspond to the wider field-of-view. In the retracted orientation, the bypass mirror 70 is oriented transverse with respect to the bypass orientation.

Referring again to FIGS. 6a and 6b, the bypass mirror 70 can be movable about multiple degrees of movement or freedom. For example, the bypass mirror 70 can swing or translate about a first axis 78, and can twist or tilt about a second axis 82. In addition, the bypass mirror 70 can be moved about the multiple degrees of movement or freedom, and between the bypass and retracted configurations B and R, by a single actuator, such as a micro motor 86 with a gearhead and an integral encoder. Furthermore, the second axis 82 itself can be moved and oriented with respect to the first axis 78, as shown.

Figure 7A:
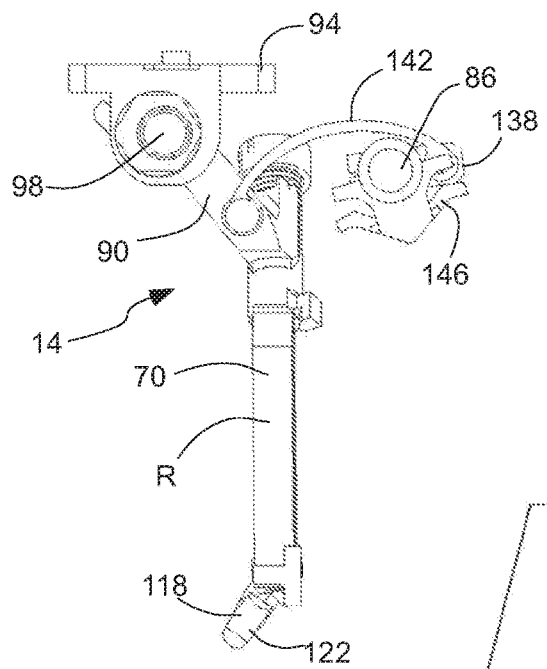
FIG. 7a is a front view of the field-of-view bypass assembly of the optical system of FIG. 1a, with the field-of-view bypass assembly in the retracted or non-bypass configuration.
Figure 7B:
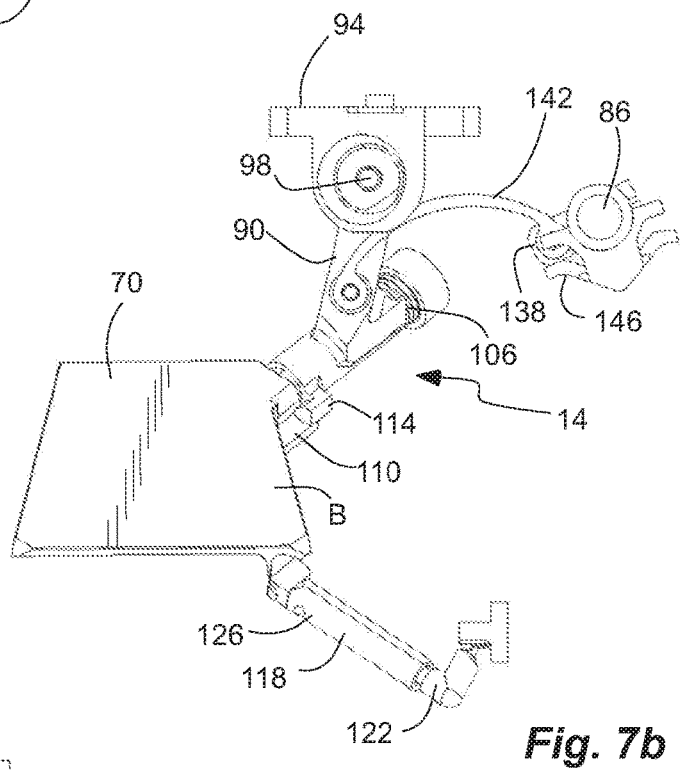
FIG. 7b is a front view of the field-of-view bypass assembly of the optical system of FIG. 1a, with the field-of-view bypass assembly in the bypass configuration.
Figure 8A:
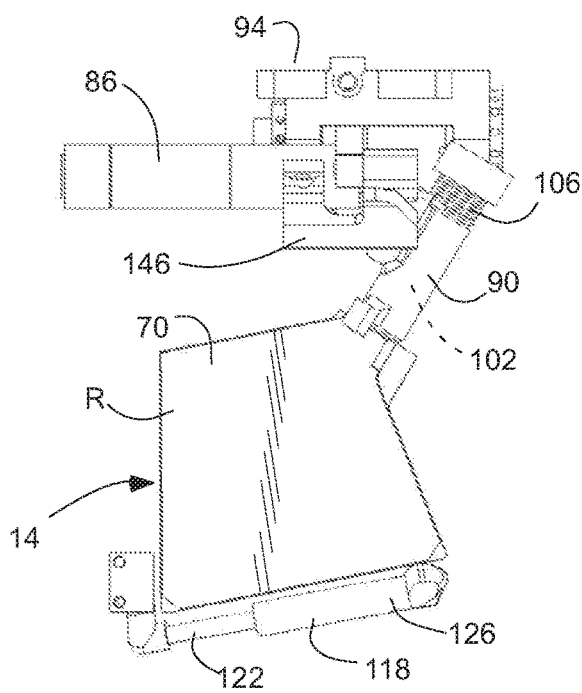
FIG. 8a is a side view of the field-of-view bypass assembly of the optical system of FIG. 1a, with the field-of-view bypass assembly in the retracted or non-bypass configuration.
Figure 8B:
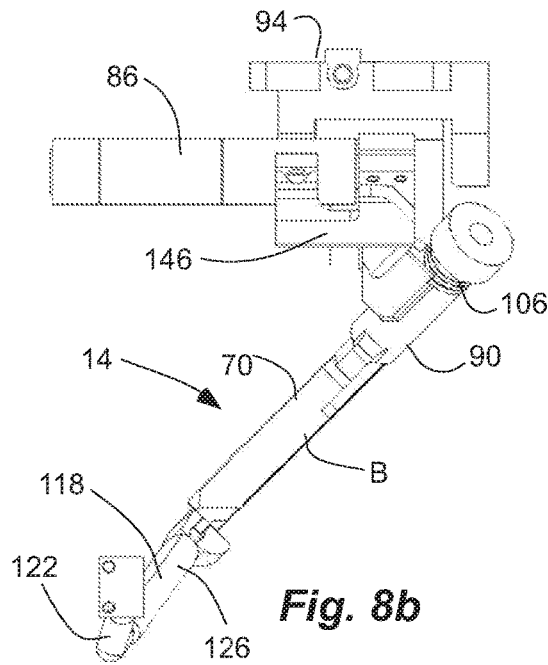
FIG. 8b is a side view of the field-of-view bypass assembly of the optical system of FIG. 1a, with the field-of-view bypass assembly in the bypass configuration.
Figure 9A:
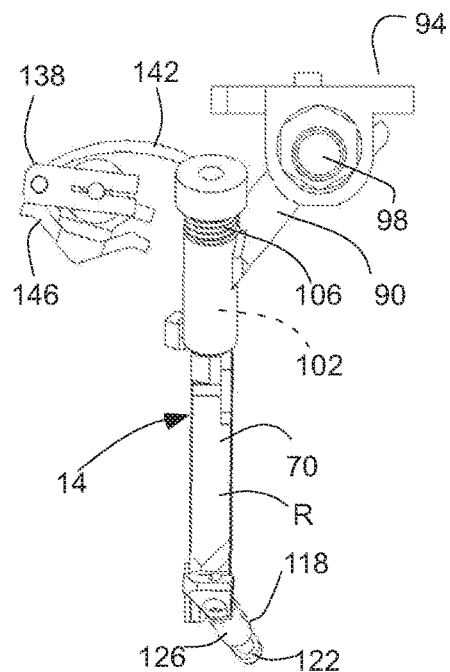
FIG. 9a is a rear view of the field-of-view bypass assembly of the optical system of FIG. 1a, with the field-of-view bypass assembly in the retracted or non-bypass configuration.
Figure 9B:
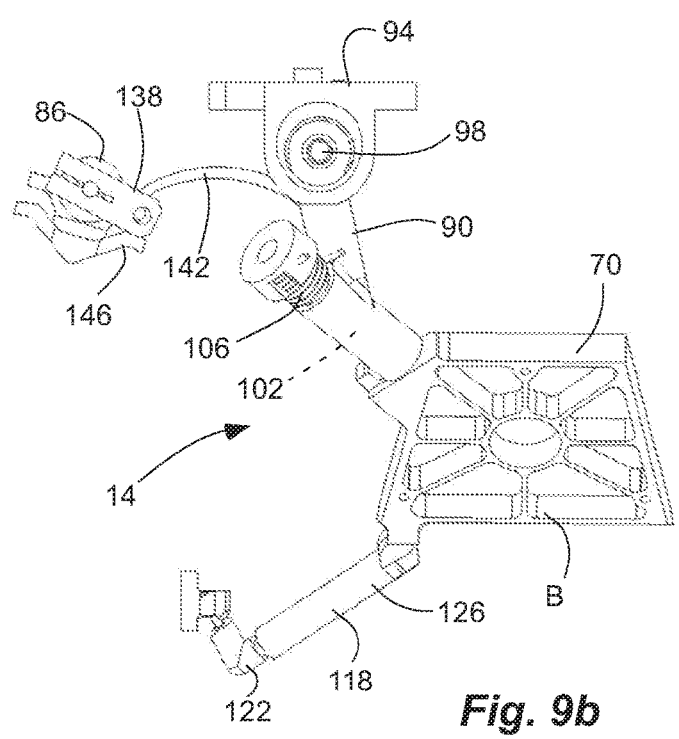
FIG. 9b is a rear view of the field-of-view bypass assembly of the optical system of FIG. 1a, with the field-of-view bypass assembly in the bypass configuration.
Figure 10A:
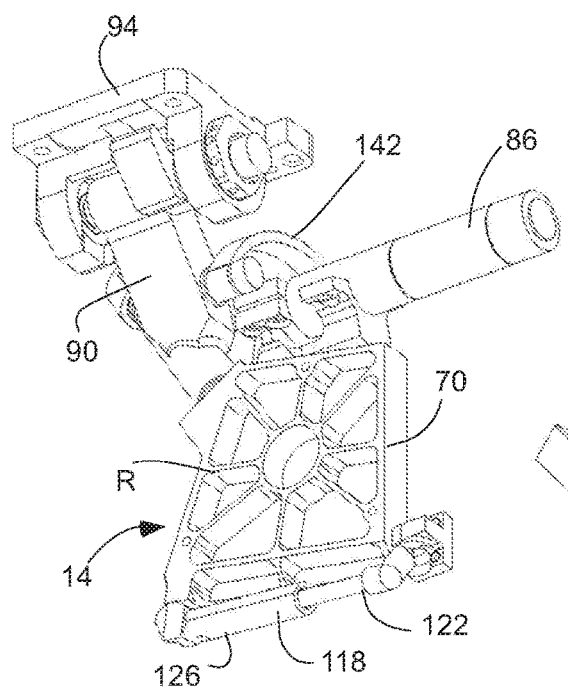
FIG. 10a is a bottom perspective view of the field-of-view bypass assembly of the optical system of FIG. 1a, with the field-of-view bypass assembly in the retracted or non-bypass configuration.
Figure 10B:
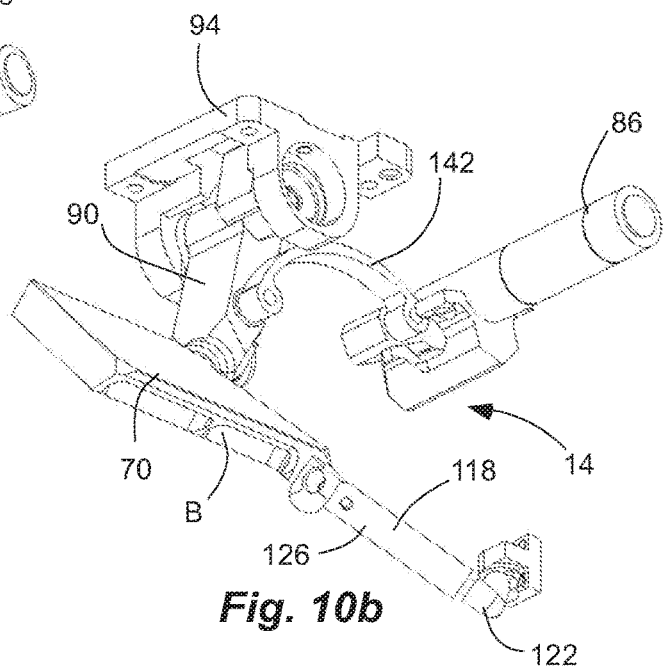
FIG. 10b is a bottom perspective view of the field-of-view bypass assembly of the optical system of FIG. 1a, with the field-of-view bypass assembly in the bypass configuration.
Figure 11:
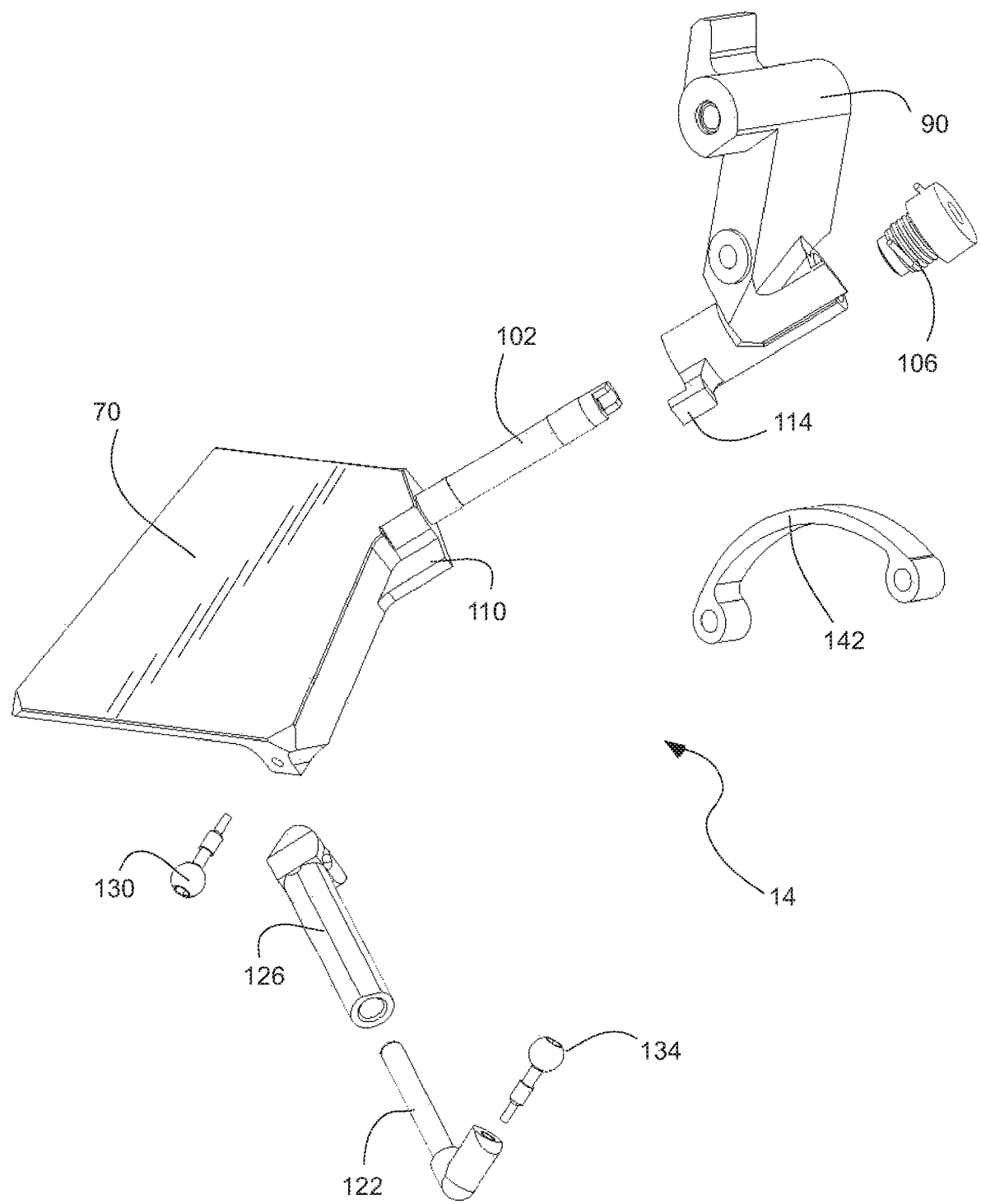

FIGS. 7a and 7b depict looking forwardly into the bypass assembly 14 without the housing 18 and the optical assembly 46, in the retracted configuration R and the bypass configuration B, respectively. Similarly, FIGS. 8a and 8b depict looking laterally at the bypass assembly 14 without the housing 18 and the optical assembly 46, in the retracted configuration R and the bypass configuration B, respectively. Similarly, FIGS. 9a and 9b depict looking rearwardly at the bypass assembly 14 without the housing 18 and the optical assembly 46, in the retracted configuration R and the bypass configuration B, respectively. Similarly. FIGS. 10a and 10b depict looking from a lower perspective at the bypass assembly 14 without the housing 18 and the optical assembly 46, in the retracted configuration R and the bypass configuration B, respectively. FIG. 11 depicts the bypass assembly 14 partially exploded.

The bypass assembly 14 can further comprise a swing arm 90 pivotally coupled with respect to the optical assembly 46 (FIGS. 1a-6b) and the housing 18 (FIGS. 1a-3). In one aspect, the swing arm 90 can be pivotally coupled to a mount 94, which in turn can be mounted to, carried by and disposed in the housing 18 (FIGS. 1a-3). Thus, the swing arm 90 is pendent from the mount 94. The mount 94 and the swing arm 90 can be pivotally coupled together by an axle 98, which can define the first axis 78 (FIGS. 6a and 6b). The mount 94 can also have offset cams stops to adjust elevation and azimuth angle of the bypass mirror 70. In one aspect, the swing arm 90 can pivot approximately 52 degrees to translate or displace the bypass mirror 70 between the bypass and retracted configurations B and R. The bypass mirror 70 is carried by a distal end of the swing arm 90. Thus, as the swing arm 90 pivots about the axle 98, the bypass mirror 70 is displaced between the bypass and retracted configurations B and R. The swing arm 90 is selectively swingable by the motor 86 to position the bypass mirror 70 between the bypass and the retracted configurations B and R.

In addition, the bypass mirror 70 can be pivotally coupled to the swing arm 90 so that the bypass mirror 70 both swings or pivots along with the swing arm 90, and tilts or pivots with respect to or on the swing arm 90. The bypass mirror 70 can be pivotally coupled to the swing arm 90 by an axle 102 (FIG. 11), which can define the second axis 82 (FIGS. 6a and 6b). Thus, the bypass mirror 70 can be coupled to the axle 102, and can pivot with respect to the swing arm 90 about the axle 102, and about the second axis 82. In one aspect, the axle 102 can extend from the bypass mirror 70 and into a bore at the distal end of the swing arm 90, as shown in FIG. 11. A torsion spring 106 can be coupled to the axle 102, and between the bypass mirror 70 and the swing arm 90. The torsion spring 106 can bias the bypass mirror 70 with respect to the spring arm 90, and namely towards the bypass configuration B. Corresponding tabs 110 and 114 can extend from the bypass mirror 70 and the swing arm 90, respectively, to abut to one another in the bypass configuration B, as shown in FIGS. 7b and 11.

In addition, the bypass assembly 14 further comprises a telescoping arm 118 that is pivotal with respect to the optical assembly 46 (FIGS. 1a-6b) and the housing 18 (FIGS. 1a-3). The telescoping arm 118 is coupled to and between the bypass mirror 70 and the housing 18, as shown in FIGS. 1b and 2b. The bypass mirror 70 is coupled to a distal end of the telescoping arm 118. In one aspect, the bypass mirror 70 is suspended between the swing arm 90 on one end and the telescoping arm 118 on another end. In one aspect, the telescoping arm 118 can have a proximal arm 122 configured to couple to the housing 18 (FIGS. 7a-11) and extending into a bore of a distal arm 126 coupled to the bypass mirror 70. Thus, the telescoping arm 118 can expand and collapse or compress, with the proximal arm 122 compressing or collapsing into the distal arm 126, and the proximal arm 122 expanding out of the distal arm 126. The telescoping arm 118 can be coupled to the bypass mirror 70 and the housing 18 by ball joints so that the telescoping arm 118 can pivot with respect to both the bypass mirror 70 and the housing 18. In one example, a distal ball 130 can extend from the bypass mirror 70 and into a socket of the distal arm 126, while a proximal ball 134 can extend from the proximal arm 122 and into a socket of the housing 18 or mount on the housing.

The bypass assembly 14 can comprise the bypass mirror 70, the swing arm 90, the telescoping arm 118, and the housing 18. As the bypass mirror 70 swings on swing arm 90 from the bypass configuration B to the retracted configuration R, the telescoping arm 118 compresses or collapses, and selectively tilts the bypass mirror 70 against the force of the torsion spring 106 to orient the bypass mirror 70 to face away from the primary optical path 54, and the optical assembly 14, and towards the wall 66 of the housing 18. As the bypass mirror 70 swings on the swing arm 90 from the retracted configuration R to the bypass configuration B, the telescoping arm 118 extends and allows the torsion spring 106 to tilt the bypass mirror 70 into the primary optical path 54, and orients the bypass mirror 70 to reflect light rays along the secondary optical path 74 towards the detector 50. Thus, the torsion spring 106 and the telescoping arm 118 work together to selectively orient the bypass mirror 70 as the swing arm 90 selectively translates the bypass mirror 70.

Thus, as described above, the bypass mirror 70 is movable about multiple degrees of movement or freedom, such as swinging or translating about the first axis 78 (FIGS. 6a and 6b) by the swing arm 90, and twisting or tilting about the second axis 82 (FIGS. 6a and 6b) by the torsion spring 106 and the telescoping arm 118. The bypass mirror 70 can be both translated and tilted by the single actuator or motor 86. The motor 86 can have an armature 138 coupled to the motor 86, and selectively movable by the motor 86, such as back and forth through a substantially 180 degree arc, perhaps best shown in FIGS. 9a and 9b. A spring link 142 is coupled to and between the armature 138 of the motor 86 and the swing arm 90. The motor 86 swings the swing arm 90, via the spring link 142, between the retracted configuration R and the bypass configuration B. In addition, a stop 146 can be positioned adjacent the motor 86 and at an end of travel of the armature 138. The stop 146 can be compliant to deflect under contact by the armature 138 to passively decelerate the armature 138 at the end of travel. The stop 146 is sized and positioned so that the armature 138 contacts the stop 146 at opposite ends of travel of the armature 138. In one aspect, the stop 146 can have a pair of opposite wings or arms that extend in opposite directions, and each corresponding to a different end of travel of the armature 138.

Figure 12A:
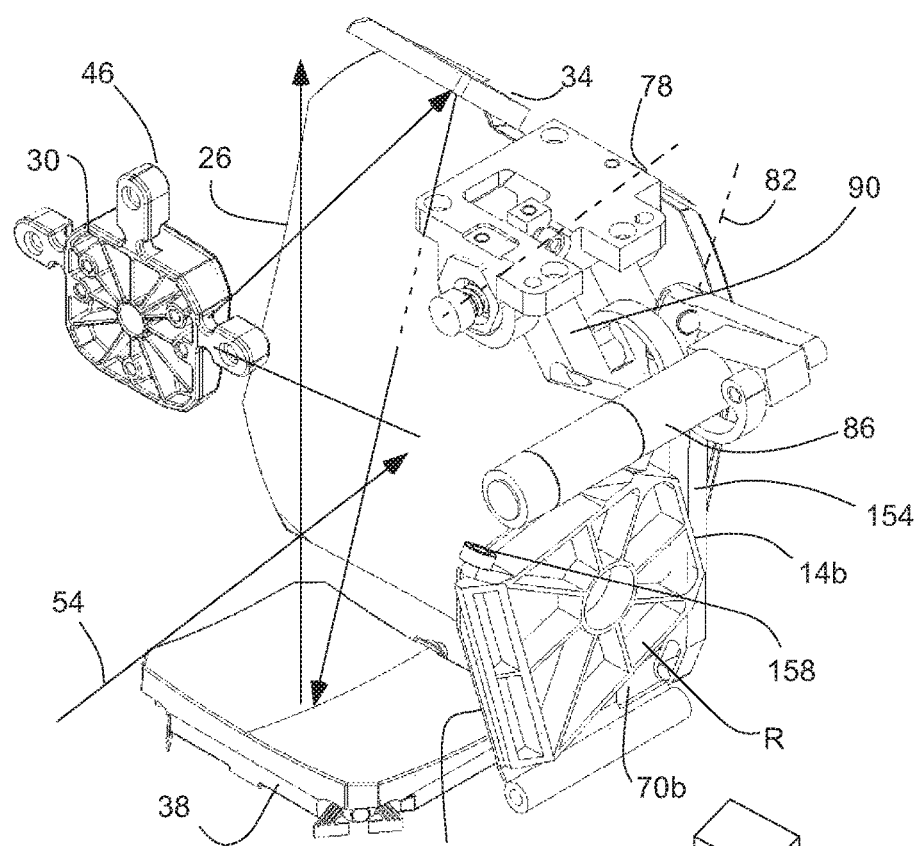
FIG. 12a is a front perspective view of an optical system of a reflective telescope having another field-of-view bypass assembly, shown with a housing of the optical system removed, and shown in a retracted or non-bypass configuration in accordance with another example of the present disclosure.
Figure 12B:
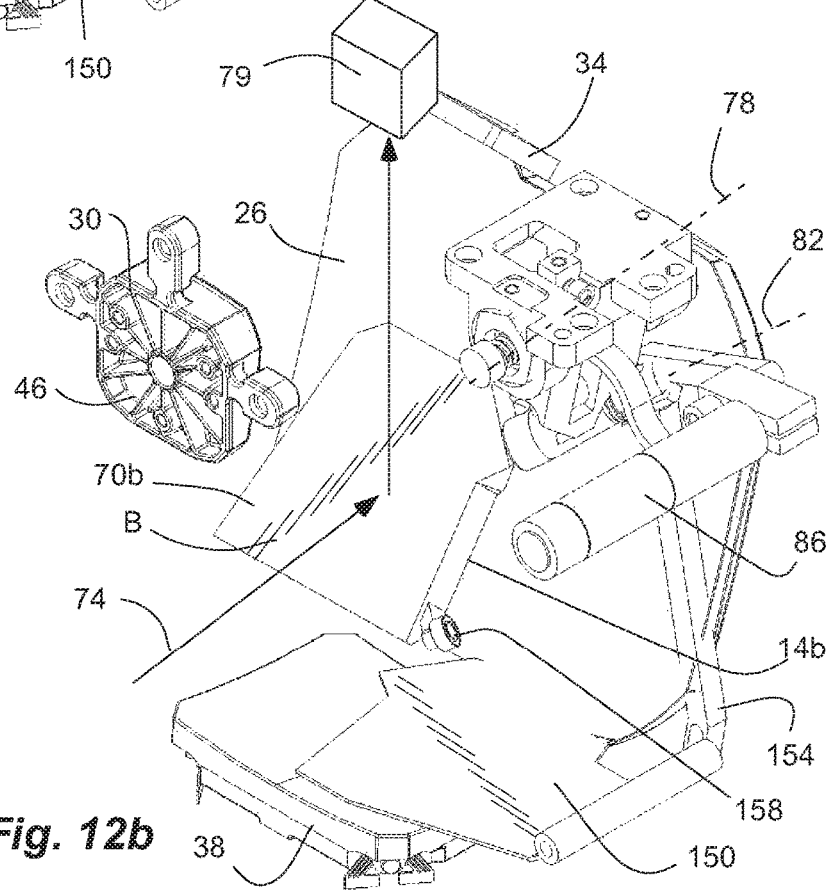
FIG. 12b is a front perspective view of the optical system of FIG. 12a, with the field-of-view bypass assembly in a bypass configuration in accordance with an example of the present disclosure.
Figure 13A:
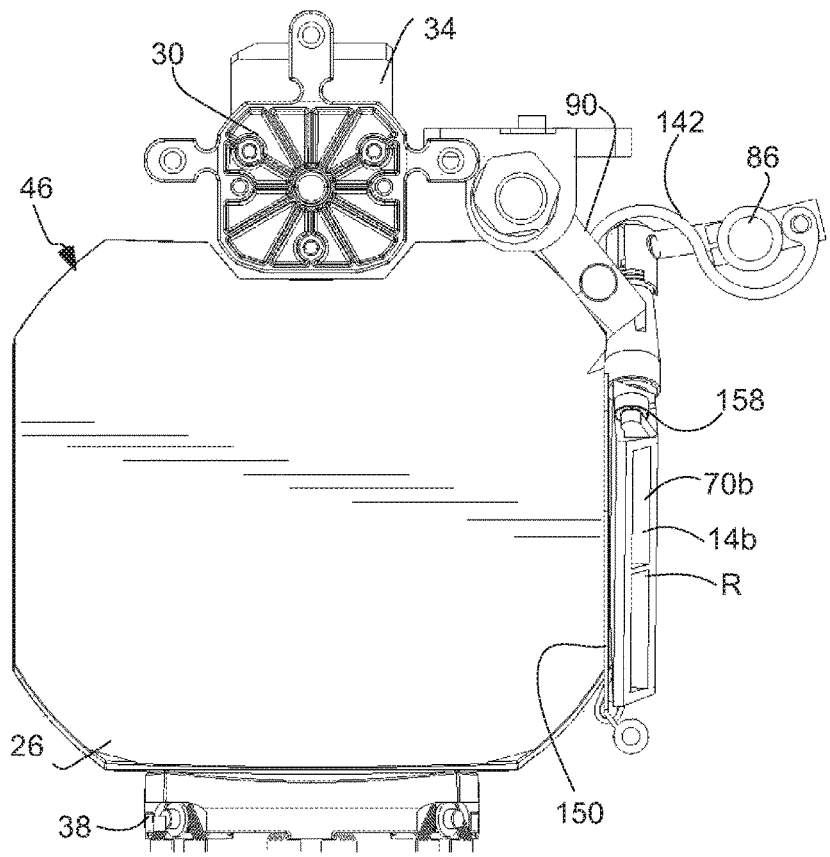
FIG. 13a is a front view of the field-of-view bypass assembly of the optical system of FIG. 12a with the field-of-view bypass assembly in the retracted or non-bypass configuration.
Figure 13B:
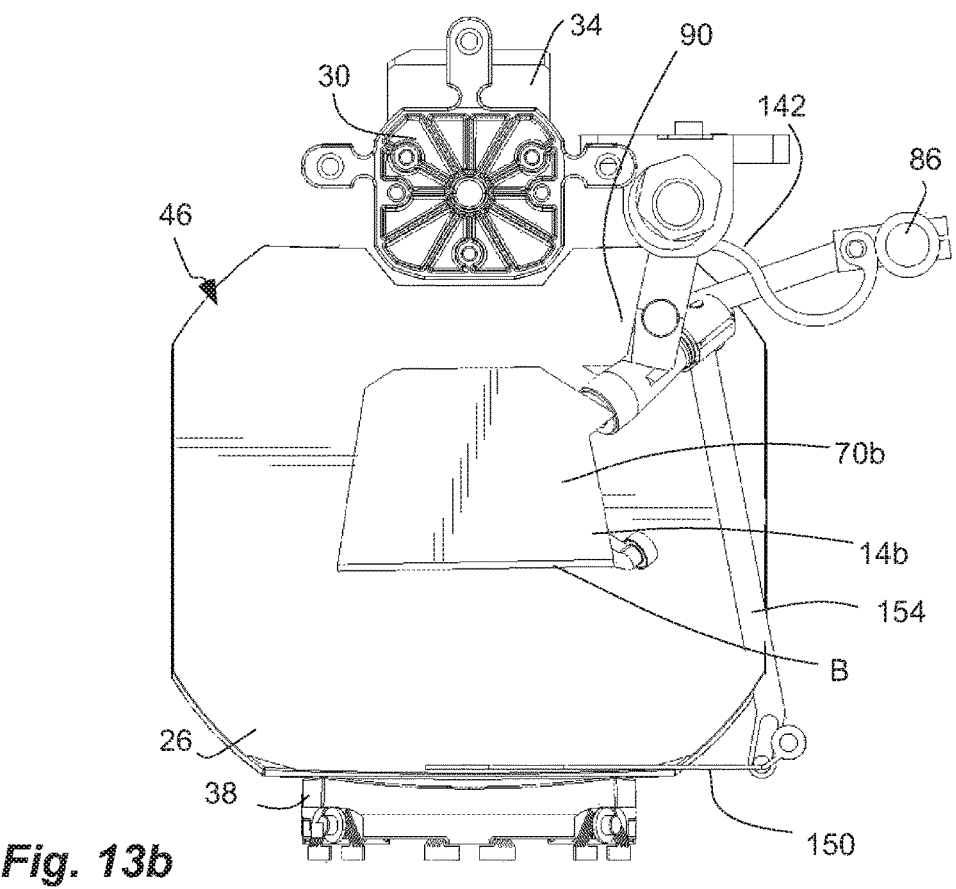
FIG. 13b is a front view of the field-of-view bypass assembly of the optical system of FIG. 12a, shown with the housing of the optical system removed, and with the field-of-view bypass assembly in the bypass configuration.
Figure 14A:
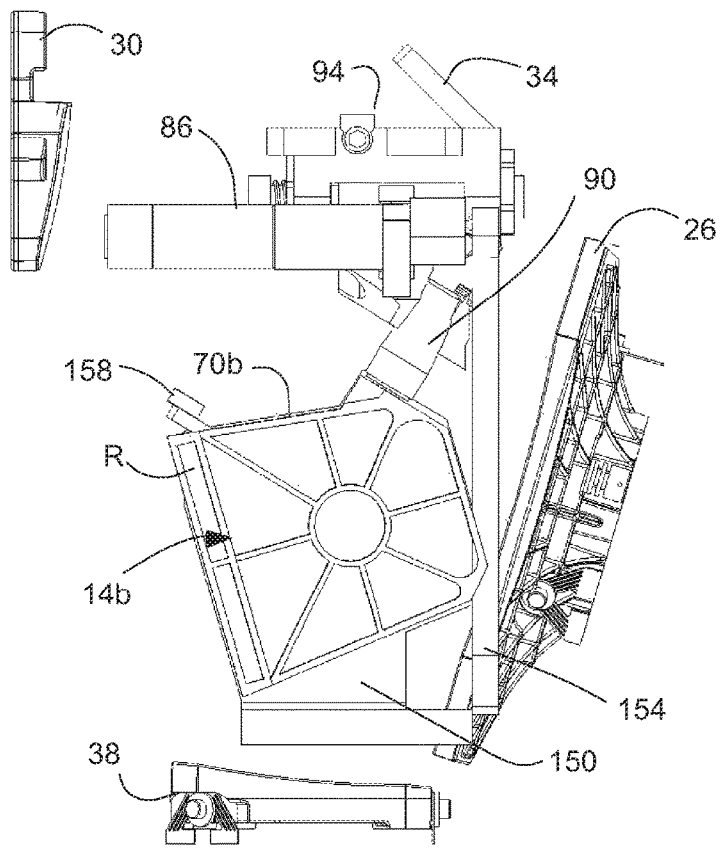
FIG. 14a is a side view of the field-of-view bypass assembly of the optical system of FIG. 12a, shown with the housing of the optical system removed, and with the field-of-view bypass assembly in the retracted or non-bypass configuration.
Figure 14B:
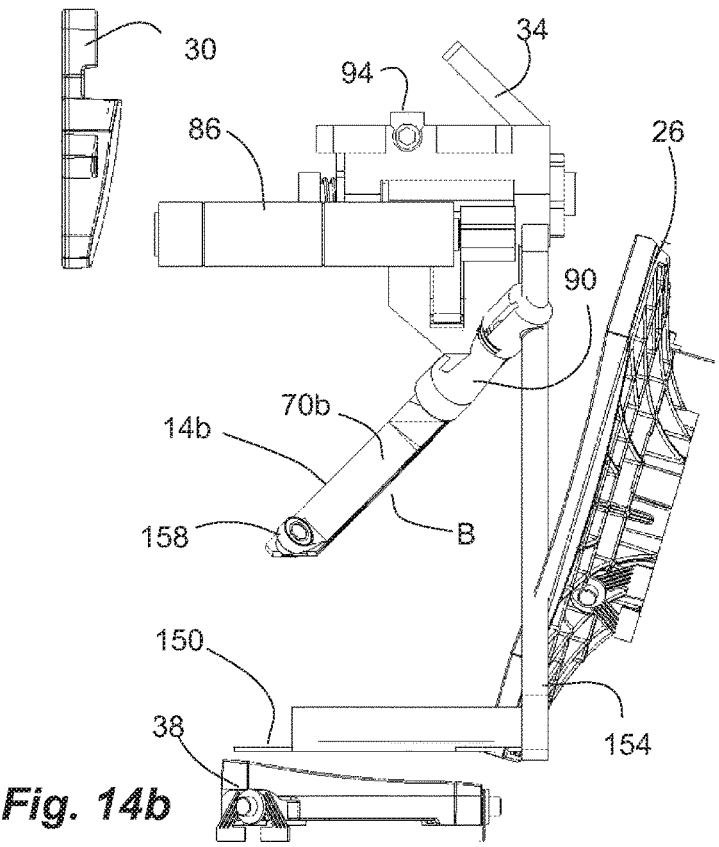
FIG. 14b is a side view of the field-of-view bypass assembly of the optical system of FIG. 12a, shown with the housing of the optical system removed, and with the field-of-view bypass assembly in the bypass configuration.

Referring now to FIGS. 12a-14b, another optical system of a reflective, high-magnification telescope with another field-of-view bypass or switch assembly 14b is shown, which is similar in many respects to that described above, and which description is hereby incorporated herein by reference. FIGS. 12a and 12b depict looking from a perspective view at the optical system, with the housing 18 removed for clarity, and with the bypass assembly 14b in the retracted configuration R and the bypass configuration B, respectively. Similarly, FIGS. 13a and 13b depict looking into the optical system, again with the housing 18 removed for clarity, and with the bypass assembly 14b in the retracted configuration R and the bypass configuration B, respectively. Similarly, FIGS. 14a and 14b depict looking laterally at the optical system, again with the housing 18 removed for clarity, and with the bypass assembly 14b in the retracted configuration R and the bypass configuration B, respectively.

The bypass assembly 14b can comprise a bypass mirror 70b movably coupled with respect to the optical assembly 46 (and the housing). In one aspect, the bypass assembly 14b can have a single bypass mirror 70b. The bypass assembly 14b can be articulated so that the bypass mirror 70b can be selectively translatable and tiltable, or displaceable and orientable (i.e., able to be oriented), between the bypass configuration B and the retracted configuration R. Thus, the bypass mirror 70b both translates and tilts together between the configurations. In the retracted configuration R, the bypass mirror 70b is both disposed out of the primary optical path 54, and is oriented transverse with respect to the bypass configuration B. Thus, the bypass mirror 70b is both displaced and reoriented.

As mentioned above, the mirror 70b is both displaced and tilted together. Unlike the bypass assembly 14 described above, in the retracted configuration R, the bypass mirror 70b can be oriented to face towards the primary optical path 54 and the optical assembly 46. Thus, the bypass assembly 14b can also comprise a shutter 150 that folds over the bypass mirror 70b in the retracted configuration R to resist stray light from reflecting off the bypass mirror 70b and into the optical assembly 46. The shutter 150 can be pivotally coupled by an axle with respect to the housing and the optical assembly 46. In addition, a link 154 can be coupled to and between the shutter 150 and the motor 86 or armature thereof. Thus, as the motor 86 and armature swing the swing arm 90, and thus the bypass mirror 70b, between the bypass configuration B and the retracted configuration R, it also folds the shutter 150 between an open orientation (FIGS. 12b, 13b and 14b) and a closed orientation (FIGS. 12a, 13a and 14a), respectively. In one aspect, the shutter 150 can have a torsion spring to bias the shutter 150 towards the closed orientation. In another aspect, the shutter 150 can fold against, and can abut to, the bypass mirror 70b in the retracted configuration R. In another aspect, the shutter 150 can have substantially the same shape and size as the bypass mirror 70b. Thus, in the retracted configuration R, a perimeter of the shutter 150 can substantially match a perimeter of the bypass mirror 70.

As described above, the bypass mirror 70b can be biased in the bypass position of the bypass configuration B by the torsion spring. The bypass mirror 70b can be tilted from the bypass configuration B to the retracted configuration R by interaction with the lateral side or wall 66 of the housing 18. Thus, as the bypass mirror 70b is swung to the retracted configuration R it abuts to the lateral side or wall 66 of the housing 18 to tilt the bypass mirror 70b to the retracted position of the retracted configuration R. In one aspect, the bypass mirror 70b can have a cam surface or wheel 158 on an edge thereof to facilitate interaction with the lateral side or wall 66 of the housing 18.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An optical system, comprising:
a detector;
an optical assembly that reflects light rays through a primary optical path to the detector; and
a field-of-view bypass assembly, comprising:
a bypass mirror movably coupled with respect to the optical assembly;
the bypass mirror being selectively movable in multiple degrees of freedom between:
a bypass configuration with the bypass mirror disposed in and interrupting the primary optical path and oriented to define a secondary optical path to the detector; and
a retracted configuration, different than the bypass configuration, with the bypass mirror both disposed out of the primary optical path and oriented transverse with respect to the bypass configuration.

2. The system of claim 1, further comprising:
the bypass mirror being oriented to face away from the primary optical path and the optical assembly in the retracted configuration.

3. The system of claim 1, further comprising:
the bypass mirror being both positioned and oriented to oppose a lateral side of the optical assembly in the retracted configuration.

4. The system of claim 1, further comprising:
a housing containing the optical assembly;
a lateral volume defined between a lateral perimeter of the optical assembly and a lateral side of the housing; and
the bypass mirror being disposed in the lateral volume in the retracted configuration.

5. The system of claim 1, wherein the bypass mirror is movable about multiple degrees of movement.

6. The system of claim 5, further comprising:
a single actuator operatively coupled to the bypass mirror and moving the bypass mirror about the multiple degrees of movement, and between the bypass and the retracted configurations.

7. The system of claim 1, further comprising:
a swing arm pivotally coupled with respect to the optical assembly;
the bypass mirror carried by a distal end of the swing arm; and
the swing arm being selectively swingable to position the bypass mirror between the bypass and the retracted configurations.

8. The system of claim 7, further comprising:
a telescoping arm pivotal with respect to the optical assembly;
the bypass mirror coupled to a distal end of the telescoping arm;
the bypass mirror being suspended between the swing arm and the telescoping arm; and
the telescoping arm selectively tilting the bypass mirror as the swing arm swings to orient the bypass mirror to orient the bypass mirror to face away from the primary optical path and the optical assembly in the retracted configuration.

9. The system of claim 8, further comprising:
ball and socket joints at each end of the telescoping arm.

10. The system of claim 8, further comprising:
an axle between the distal end of the swing arm and the bypass mirror; and
the bypass mirror coupled to the axle and pivoting with respect to the swing arm about the axle.

11. The system of claim 10, further comprising:
a torsion spring coupled to the axle and biasing the bypass mirror with respect to the spring arm to orient the bypass mirror to reflect light rays along the secondary optical path towards the detector in the bypass configuration.

12. The system of claim 7, further comprising:
a motor with an armature coupled to the motor and selectively movable by the motor;
a spring link coupled between the armature of the motor and the swing arm; and
the motor swinging the swing arm, via the spring link, between the retracted configuration and the bypass configuration.

13. The system of claim 12, further comprising:
a stop positioned adjacent the motor and at an end of travel of the armature; and
the stop being compliant to deflect under contact by the armature to passively decelerate the armature.

14. The system of claim 13, wherein the stop is sized and positioned so that the armature contacts the stop at opposite ends of travel of the armature.

15. The system of claim 1, wherein the bypass assembly further comprises a shutter operable to cover the bypass mirror in the retracted configuration to resist stray light from reflecting off the bypass mirror and into the optical assembly.

16. An optical system, comprising:
a housing;
a detector;
an optical assembly disposed in the housing and that reflects light rays through a primary optical path to the detector;
a lateral volume defined between a lateral perimeter of the optical assembly and a lateral side of the housing; and
a field-of-view bypass assembly disposed in the housing, and comprising:
a bypass mirror movably coupled with respect to the optical assembly;
the bypass mirror being selectively movable in multiple degrees of freedom between:
a bypass configuration with the bypass mirror disposed in and interrupting the primary optical path and oriented to define a secondary optical path to the detector; and
a retracted configuration, different than the bypass configuration, with the bypass mirror being disposed in the lateral volume between the lateral perimeter of the optical assembly and the lateral side of the housing.

17. The system of claim 16, wherein the bypass mirror is both disposed out of the primary optical path and oriented to face away from the primary optical path and the optical assembly in the retracted configuration.

18. The system of claim 16, further comprising:
a swing arm pivotally coupled with respect to the housing;
the bypass mirror being carried by a distal end of the swing arm; and
the swing arm selectively swinging to position the bypass mirror between the bypass and the retracted configurations.

19. The system of claim 18, further comprising:
a telescoping arm pivotally coupled with respect to the housing;
the bypass mirror coupled to a distal end of the telescoping arm;
the bypass mirror being suspended between the swing arm and the telescoping arm; and
the telescoping arm selectively tilting the bypass mirror as the swing arm swings to orient the bypass mirror to face away from the primary optical path and the optical assembly in the retracted configuration.

20. The system of claim 19, further comprising:
an axle between the distal end of the swing arm and the bypass mirror; and
the bypass mirror coupled to the axle and pivoting with respect to the swing arm about the axle.

21. The system of claim 20, further comprising:
a torsion spring coupled to the axle and biasing the bypass mirror with respect to the swing arm to orient the bypass mirror to reflect light rays along the secondary optical path towards the detector in the bypass configuration.

22. The system of claim 18, further comprising:
a motor with an armature coupled to the motor and selectively movable by the motor;
a spring link coupled between the armature of the motor and the swing arm; and
the motor swinging the swing arm, via the spring link, between the retracted position and orientation and the bypass position and orientation.

23. The system of claim 22, further comprising:
a stop positioned adjacent the motor and at an end of travel of the armature; and
the stop being compliant to deflect under contact by the armature to passively decelerate the armature.

24. The system of claim 22, wherein the bypass assembly further comprises a shutter operable to cover the bypass mirror in the retracted configuration to resist stray light from reflecting off the bypass mirror and into the optical assembly.

25. An optical system, comprising:
a detector;
an optical assembly that reflects light rays through a primary optical path to the detector; and
a field-of-view bypass assembly, comprising:
a bypass mirror movably coupled with respect to the optical assembly;
the bypass mirror being selectively movable in multiple degrees of freedom between:
a bypass configuration with the bypass mirror disposed in and interrupting the primary optical path and oriented to define a secondary optical path to the detector; and a retracted configuration, different than the bypass configuration, with the bypass mirror both disposed out of the primary optical path and oriented to face away from the optical assembly and the primary optical path.

\* \* \* \* \*